B. POTTER, Jr.

Gunpowder Mill.

No. 26,922.

Patented Jan'y 24, 1860.

Witnesses:
Sam Cooper
C. Baker

Inventor:
Bennett Potter Jr.

UNITED STATES PATENT OFFICE.

BENNETT POTTER, JR., OF HUBBARDSTON, MASSACHUSETTS.

GUNPOWDER-MILL.

Specification of Letters Patent No. 26,922, dated January 24, 1860.

*To all whom it may concern:*

Be it known that I, BENNETT POTTER, Jr., of Hubbardston, in the county of Worcester and State of Massachusetts, have invented a new and Improved Mill for Mixing the Ingredients of Which Gunpowder is Composed, of which the following is a full, clear, and exact description, reference being had to the accompanying drawings, making part of this specification, in which—

Figure 1:
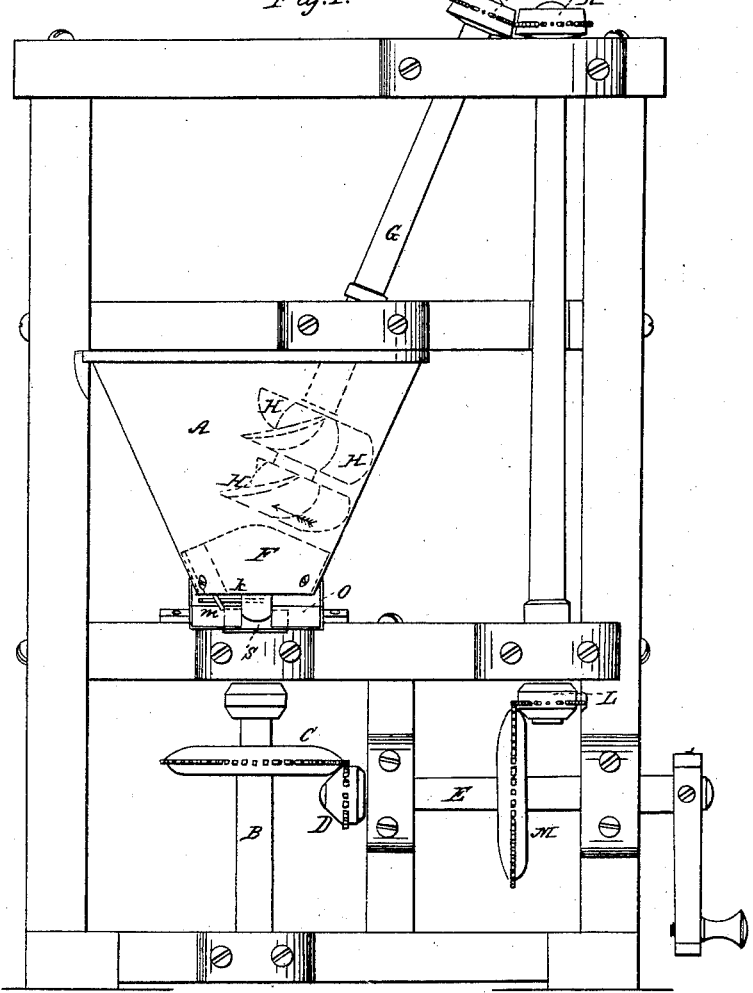
Figure 2:
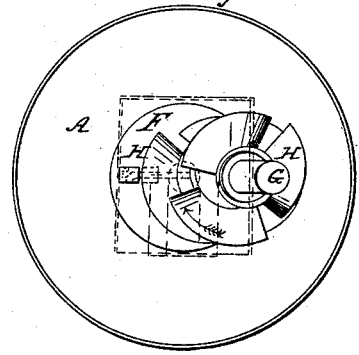
Figure 3:
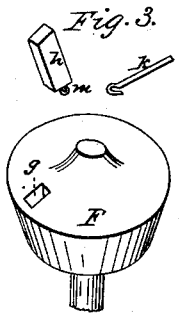
Figure 4:
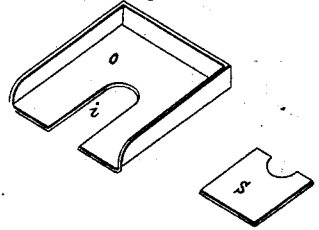

Figure 1, is a front elevation of my mill; Fig. 2, a plan of the hopper, stirrer and trough; Figs. 3 and 4, details to be hereafter referred to.

The process of mixing the ingredients of which gunpowder is composed as heretofore carried on is both tedious and expensive and the mill employed for the purpose though a costly structure is capable of operating upon only a small quantity of material at a time.

My present invention has for its object to produce a mill for the above purpose that shall be capable of operating upon a large quantity of material at one time, and of which the original expense shall be less than that of those now employed for the purpose.

To enable others skilled in the art to understand my invention I will proceed to describe the manner in which I have carried it out.

In the said drawings the hopper A is secured to a vertical shaft B, which is connected by the gears C, D, with the driving shaft E. The smaller end of the hopper is closed by a conical bottom F, (seen dotted in Fig. 1, and detached in Fig. 3) through which there is an opening $g$ which is closed by the cylindrical plug $h$. This plug is held in place by a pin $k$, which passes through the eye $m$, and into the shaft B. Immediately beneath the hopper A, is an inclined trough O, (seen dotted in Fig. 2, and detached in Fig. 4) through which the hopper is emptied. The point of the trough from the shaft out is cut away and the opening $i$ thus formed is closed by a slide S. When the hopper is to be emptied the slide is withdrawn and the pin $k$ removed from its hole in the shaft B. The plug $h$, is then withdrawn through the opening $i$ in the trough, the slide $s$, is replaced and the hopper is allowed to empty itself while it continues to revolve. When this is effected the slide $s$ is again withdrawn, the plug $h$ and pin $k$, are inserted and the hopper is ready for another charge.

The stirrer by which the mixing of the ingredients is effected consists of spiral blades H, arranged as seen in the drawings upon an inclined shaft G, which is hung in bearings in the frame work, so that its lower extremity does not reach the bottom of the hopper. The shaft G, is connected by means of the gearing I, K, L, M, with the driving shaft E, and is so revolved as to lift the material which is exposed to the action of its blades, and raise it from the bottom to the top of the hopper, and as the hopper at the same time revolves the blades of the stirrer are brought constantly to bear upon fresh portions of the material, no part of which is suffered to remain undisturbed, the whole being thoroughly and intimately mixed.

It will be observed that no portion of the stirrer or of its shaft comes in contact with the interior of the hopper by which friction is avoided and the danger from explosion is greatly lessened.

In the stirrer represented in the drawings there are two series of blades H, but it is evident that any number of such circles or series of blades may be employed without departing from the spirit of my invention.

What I claim as my invention and desire to secure by Letters Patent is—

The inclined revolving stirrer in combination with the revolving hopper operating in the manner substantially as herein set forth.

BENNETT POTTER, JR.

Witnesses:
SAM COOPER,
E. MASSON.